June 11, 1957     J. PLUIM     2,795,486
PREPARATION OF AMMONIUM SULFATE
Filed Aug. 11, 1953
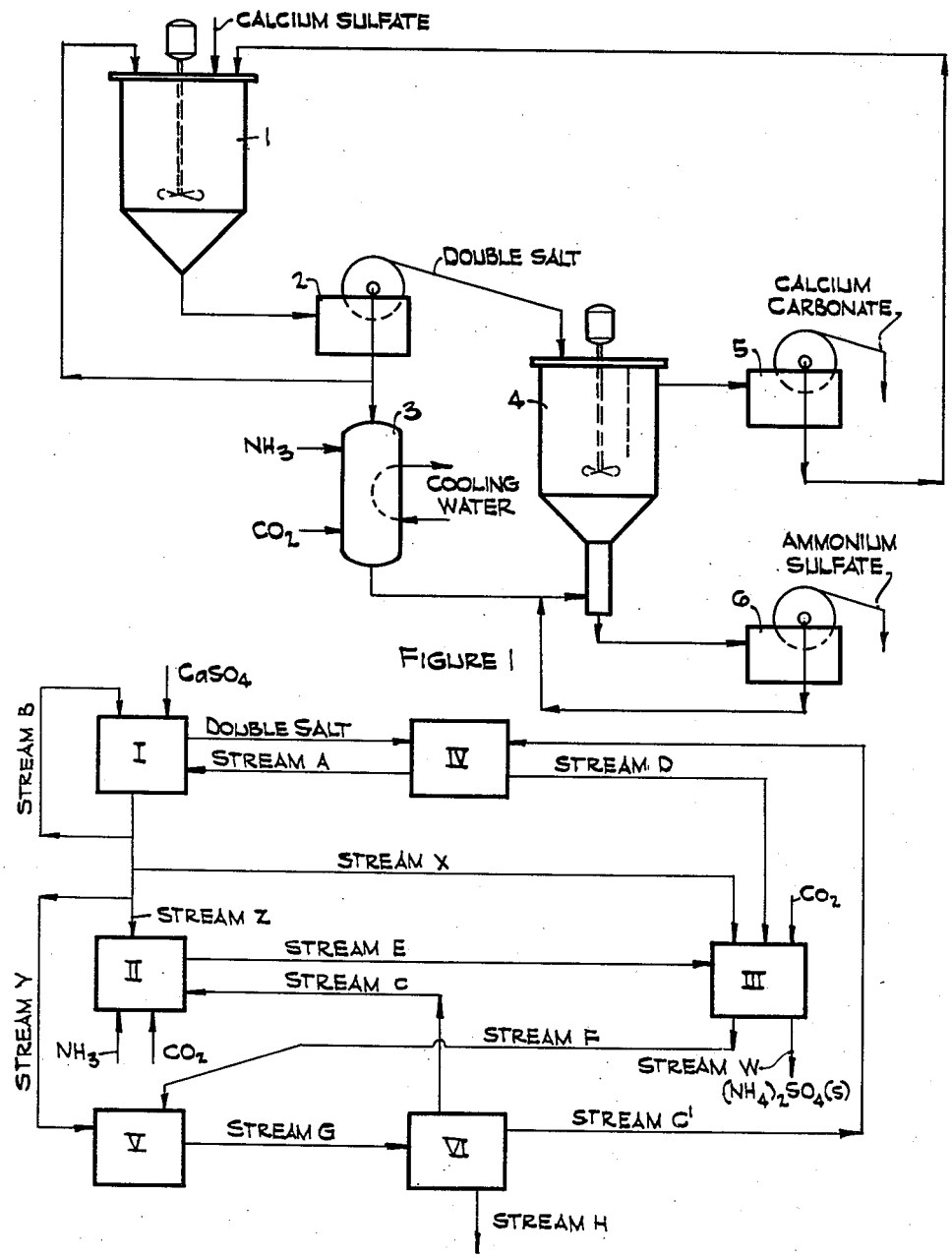
Inventor:
Jan Pluim
By Alan C. Batchelor
His Agent 2,795,486
Patented June 11, 1957

2,795,486
PREPARATION OF AMMONIUM SULFATE

Jan Pluim, Haarlem, Netherlands, assignor to Shell Development Company, Emeryville, Calif., a corporation of Delaware Application August 11, 1953, Serial No. 373,514

Claims priority, application Netherlands August 14, 1952

7 Claims. (Cl. 23—119)

This invention relates to a process for the manufacture of ammonium sulfate. More particularly, this invention relates to a process for the manufacture of ammonium sulfate in the form of crystals of uniform size and shape.

A method for the manufacture of ammonium sulfate is known which consists of the reaction of solid calcium sulfate with an aqueous solution of ammonium carbonate to give ammonium sulfate as product and solid calcium carbonate as by-product. The ammonium sulfate produced by this method is recovered as an aqueous solution, from which the ammonium sulfate can be obtained in the form of crystals only by the evaporation of a major part of the water of solution. This method is subject, therefore, to the serious objection that a great amount of heat must be supplied to evaporate the water of solution. To avoid this relatively costly evaporation step, it has been proposed to carry out the conversion of ammonium carbonate to ammonium sulfate in a saturated solution of ammonium sulfate. In such a process, the product ammonium sulfate crystallizes out directly from the reaction mixture, without requiring evaporation of any of the water of solution. The crystalline ammonium sulfate is separated from the calcium carbonate by elutriation, or other suitable methods.

This latter process has two variations. In one, the ammonia and carbon dioxide are added to a saturated solution of ammonium sulfate, the heat of reaction is removed and the resulting solution is reacted with calcium sulfate. In the other, calcium sulfate, ammonia and carbon dioxide are all added to a saturated solution of ammonium sulfate, the heat of reaction again being removed. In both cases, the product is crystalline ammonium sulfate. These variations also are subject to serious objection.

In the first variation, introduction of ammonia and carbon dioxide into the saturated solution of ammonium sulfate to form ammonium carbonate causes precipitation of ammonium sulfate due to the common ion effect which materially reduces the solubility of the ammonium sulfate in the solution. The precipitation of ammonium sulfate at this point in the process leads to several complications. Primarily, premature crystallization of ammonium sulfate causes the final product to be undesirably non-uniform in the size and shape of the crystals, because the ammonium sulfate crystals formed during the addition of the carbon dioxide and ammonia differ materially in size and crystal habit from those formed during the reaction of the ammonium carbonate with the main body of the suspension of calcium sulfate.

In the production of crystalline ammonium sulfate, the formation of crystals of a certain size and habit is an important objective, because the physical form of the ammonium sulfate to a very large degree determines its usefulness. The standards set up by the industry regarding physical condition of the crystals are very rigorous. It is desirable that the crystals formed be relatively large, uniform in size and of rhombohedral habit, with substantial growth along all three axes, for if the crystals formed are small, or are non-uniform in shape, or are in the form of needles or plates (which habits ammonium sulfate may take), filtering and drying of the product is much more difficult. Further, large crystals of uniform size and shape possess greater resistance to abrasion and shock which come with handling, are more easily handled and packaged, and when used as fertilizer, are much more easily passed through the specialized equipment used for spreading the fertilizer on the land, than are small crystals, or crystals of irregular size and shape. An additional important reason for requiring the crystalline ammonium sulfate to be in the form of large, well-developed rhombohedral crystals is that ammonium sulfate in this crystalline form is much less subject to bridging, caking and cementing, both in handling and during storage. The prior art process employing a saturated ammonium sulfate solution usually does not produce such a product without the necessity of re-crystallization, which again leads to the relatively costly evaporation of water of solution.

Apart from the premature precipitation of ammonium sulfate the first variation of the process mentioned above leads to further complications. When ammonia and carbon dioxide are mixed in solution, a great deal of heat is liberated. Since ammonium carbonate is unstable and decomposes if heated, the reaction of ammonia and carbon dioxide to form ammonium carbonate must be conducted at near room temperature, and the heat generated by the reaction of carbon dioxide and ammonia must be removed from the ammonium carbonate solution immediately. It is very difficult to remove heat where the ammonia and carbon dioxide are introduced directly into a saturated ammonium sulfate solution, for the ammonium sulfate crystals deposit on the sides of the vessel and on any cooling coils which might be used, thus preventing efficient heat transfer. Also, the temperature of the solution near the cooling coils and the surface of the cooling coils themselves, may be materially lower than the temperature of the body of the solution. This condition may lead to local crystallization of the ammonium sulfate on the cooling coils, due to the lower solubility of the ammonium sulfate in the cooler solution. To prevent this would require that the solution be thoroughly agitated, again resulting in added equipment to carry out the reaction.

In the second variation the heat generated by the reaction of carbon dioxide and ammonia must likewise be removed. In this case the removal of heat is very difficult as calcium carbonate is precipitated in the reaction mixture in which the reaction between carbon dioxide and ammonia is carried out. Calcium carbonate deposits form on the sides of the vessel and would deposit also on any cooling coils present. As a result thereof heat transfer would be practically excluded.

From these facts, it will be seen that all of the presently existing processes for the production of ammonium sulfate by the reaction of ammonium carbonate with calcium sulfate possess serious drawbacks which greatly reduce their value for the commercial economic production of ammonium sulfate in the desired form.

It has now been discovered that all of these difficulties may be overcome by reacting a solid double salt of calcium sulfate and ammonium sulfate $$(CaSO_4 \cdot (NH_4)_2SO_4 \cdot H_2O \text{ or } 2CaSO_4 \cdot (NH_4)_2SO_4)$$

with a solution of ammonium carbonate that is nearly saturated—but not completely saturated—with ammonium sulfate to form calcium carbonate (solid) and ammonium sulfate (crystalline and in solution), the reaction proceeding according to the equations:

(a) $(NH_4)_2SO_4 \cdot CaSO_4 \cdot H_2O + (NH_4)_2CO_3$
$= CaCO_3 + 2(NH_4)_2SO_4 + H_2O$ (b) $(NH_4)_2SO_4 \cdot 2CaSO_4 + 2(NH_4)_2CO_3$
$= 2CaCO_3 + 3(NH_4)_2SO_4$ This procedure eliminates in the following ways the problems presented by the prior art processes: (a) it provides a method for obtaining ammonium sulfate in the crystalline form, of uniform size and shape crystals possessing increased strength without requiring the evaporation of a large amount of water of solution and/or recrystallization; and (b) it eliminates the necessity of working with a saturated solution of ammonium sulfate—this in turn eliminating the problems of premature crystallization and inefficient removal of the heat of reaction of ammonia and carbon dioxide.

Essentially, the novel process of the invention comprises: (a) forming a double salt of calcium sulfate and ammonium sulfate; (b) separating the double salt from the mother liquor; (c) preparing a solution of ammonium carbonate in a concentrated aqueous solution of ammonium sulfate; (d) reacting the ammonium carbonate-ammonium sulfate solution with the double salt to form solid calcium carbonate and solid crystalline ammonium sulfate; and (e) separating the two solids by elutriation, or by other suitable methods.

In certain of the known processes for producing ammonium sulfate, calcium sulfate as such is reacted with ammonium carbonate, $$CaSO_4 + (NH_4)_2CO_3 = CaCO_3 + (NH_4)_2SO_4$$

one mole of ammonium sulfate being produced per mole of ammonium carbonate reacted. The ammonium sulfate formed crystallizes out because the solution is already saturated with ammonium sulfate. Employment of a less-than-saturated solution of ammonium sulfate is not feasible, because of the reduction in yield of ammonium sulfate crystals which such a practice entails. Therefore, the practitioner of the prior art process must deal with a saturated solution of ammonium sulfate, with the consequent difficulties which accompany the use of such a solution.

In contrast to this known method, when the double salt enters into reaction with ammonium carbonate, from one and one-half to two moles of ammonium sulfate are obtained from each molecule of ammonium carbonate that is consumed, according to the equations:

(a) $(NH_4)_2SO_4 \cdot CaSO_4 \cdot H_2O + (NH_4)_2CO_3$
$= CaCO_3 + 2(NH_4)_2SO_4 + H_2O$
(b) $(NH_4)_2SO_4 \cdot 2CaSO_4 + 2(NH_4)_2CO_3$
$= 2CaCO_3 + 3(NH_4)_2SO_4$ In the process of the invention, therefore, because one and one-half to two moles of ammonium sulfate are produced per mole of ammonium carbonate reacted, the solution of ammonium carbonate used to react with the calcium sulfate need not be saturated with respect to ammonium sulfate in order that there may be obtained from the reaction mixture a yield of crystalline ammonium sulfate that is in excess of that stoichiometrically equivalent to the amount of calcium sulfate present in the mixture. Indeed, material advantages are obtained when the solution is in fact below saturation.

This aspect of the invention may be illustrated by the following example: Assume that the reaction proceeds according to equation (a) above, two moles of ammonium sulfate being formed per mole of double salt and ammonium carbonate reacted. Assume further the following conditions: (i) the saturation concentration of ammonium sulfate in the ammonium carbonate solution here considered is 42% by weight; (ii) the solution of ammonium sulfate in ammonium carbonate actually contains 41% ammonium sulfate by weight; and (iii) the saturation concentration of ammonium sulfate in a solution of only ammonium sulfate solution is 49%. When the solution of ammonium carbonate is mixed with the double salt—the solution containing a weight of ammonium carbonate stoichiometrically equivalent to the calcium sulfate present in the double salt—ammonium sulfate forms, and remains in solution until the saturation concentration of ammonium sulfate in the system (49%) is reached, at which point solid ammonium sulfate begins to crystallize from the solution. It will be seen that the amount of ammonium sulfate required to saturate the solution is relatively small; hence if a volume of ammonium carbonate solution containing a weight of ammonium carbonate stoichiometrically equivalent to the weight of calcium sulfate present in the double salt is reacted with the double salt, the yield of crystalline ammonium sulfate will be two moles minus the dissolved salt, a yield of ammonium sulfate which is at least in excess of the amount of ammonium sulfate stoichiometrically equivalent to the calcium sulfate reacted.

This result is obtained without the necessity of employing any solution that is saturated with ammonium sulfate, or any other salt, with the exception of the solution present in the actual reaction theatre. Removal of the heat of reaction and the heat of solution resulting from the introduction of the ammonia and carbon dioxide presents no problem in such a case and the size and shape of the crystals formed are easily controlled.

The precise nature of the present invention may be further explained by considering the solubility relationships of the various systems involved. The basis for certain of the solubility and equilibrium relationships herein considered is to be found in an article by Hill and Yanick, in the Journal of the American Chemical Society, volume 57, pages 645–651, published in 1935. In this article, the various solubility and equilibrium relationships in the system, $CaSO_4-(NH_4)_2SO_4-H_2O$, were determined for various temperatures. The results are presented in both tabular and graphic form. The equilibrium relationships determined and published in this article are used in the following discussion for the purpose of determining limiting—e. g., maximum and/or minimum—values for the concentration of ammonium sulfate in the ammonium sulfate-calcium sulfate-water and ammonium sulfate-water systems. Limiting values for the concentration of ammonium sulfate in the ammonium sulfate-ammonium carbonate-water system were determined by the present applicant.

In the calcium sulfate-ammonium sulfate-water system, consider the concentration of ammonium sulfate in equilibrium with the solid double salt syngenite $$(CaSO_4 \cdot (NH_4)_2SO_4 \cdot H_2O)$$

to be $C_1$. In the ammonium sulfate-water system, consider the concentration of ammonium sulfate in equilibrium with solid ammonium sulfate (the saturation concentration) to be $C_2$. In the ammonium sulfate-ammonium carbonate-water solution, consider the saturation concentration of ammonium sulfate to be $C_3$. In this discussion, $C_3$ will be considered to be the minimum value for the saturation concentration of ammonium sulfate over the temperature range here considered. According to the Hill and Yanick article, at temperatures up to 100° C. $C_1$ is less than $C_2$. It has now been found that under the same conditions $C_1$ is less than $C_3$ and that $C_3$ is less than $C_2$. $C_2$ and $C_3$, however, are so nearly equal over this temperature range that upon reaction of the ammonium sulfate-ammonium carbonate solution with the double salt, very little of the ammonium sulfate formed is required to saturate the reaction mixture with respect to solid ammonium sulfate, and this salt crystallizes out in high yields. By controlling the ammonium sulfate concentration in the solution which reacts with calcium sulfate to form the double salt, two advantages may be attained: (a) the concentration of ammonium sulfate in the solution separated from the double salt may be limited to that concentration which will permit the addition of ammonia and carbon dioxide to the solution in amounts sufficient to form ammonium carbonate in the desired amount without causing crystallization of ammonium sulfate, and (b) the concentration of ammonium sulfate in the ammonium carbonate solution may be fixed below but sufficiently near the saturation concentration of ammonium sulfate in ammonium sulfate-ammonium carbonate-water system ($C_3$) that when the ammonium carbonate solution reacts with the double salt, ammonium sulfate will crystallize out of solution with but a minimum amount of ammonium sulfate being required to saturate the solution.

By controlling the concentration of ammonium sulfate in the solution used to prepare the double salt, the solution separated from the double salt may be made an ideal medium in which to carry out (a) the reaction of ammonia and carbon dioxide to form ammonium carbonate, and (b) the reaction of ammonium carbonate with the double salt to form calcium carbonate (solid) and ammonium sulfate (crystalline and in solution). Further, the solution obtained following this latter reaction and removal of the solid matter formed is an ideal medium in which to carry out the reaction of ammonium sulfate with calcium sulfate to form the double salt.

As to reaction (a), the ammonia and carbon dioxide are reacted to form ammonium carbonate in an ammonium sulfate solution in which the ammonium sulfate concentration is below $C_3$, that is, below the saturation concentration of ammonium sulfate with respect to the ammonium sulfate-ammonium carbonate solution. As a result, no ammonium sulfate crystallizes from the solution on the addition of the ammonia and carbon dioxide.

As to reaction (b), the ammonium sulfate concentration in the ammonium sulfate-ammonium carbonate-water system lies so near the saturation concentration of ammonium sulfate with respect to ammonium sulfate-water system ($C_2$) that but a very small fraction of the ammonium sulfate obtained by reaction of ammonium carbonate and calcium sulfate is needed to saturate the solution so that ammonium sulfate will crystallize, thus raising the yields of crystalline ammonium sulfate obtainable.

The solution separated from the crystalline ammonium sulfate formed by reaction of the double salt with ammonium carbonate constitutes an ideal medium in which to carry out the preparation of additional amounts of the double salt. This solution is saturated with ammonium sulfate with respect to the ammonium sulfate-water system ($C_2$), and, therefore, is more than saturated with ammonium sulfate with respect to the calcium sulfate-ammonium sulfate solution ($C_1$)—e. g., the concentration of ammonium sulfate in a solution of ammonium sulfate only which is in equilibrium with solid ammonium sulfate ($C_2$) is higher than the concentration of ammonium sulfate in a solution of ammonium sulfate only which is in equilibrium with a solid double salt ($C_1$). Therefore, a part of the ammonium sulfate combines with the calcium sulfate to form the double salt. The double salt formed crystallizes out of solution, making it unnecessary to use any product ammonium sulfate in the formation of the double salt. The amount of ammonium sulfate solution added to the calcium sulfate is controlled so that the ammonium sulfate concentration of the liquid separated from the double salt complies with the requirements for such a solution stated above—e. g., the concentration of ammonium sulfate must be such that ammonium sulfate does not crystallize from the solution when ammonia and carbon dioxide are introduced into the solution to form the ammonium carbonate, yet the concentration of ammonium sulfate must be such that when the ammonium carbonate-ammonium sulfate solution reacts with the double salt, ammonium sulfate crystallizes from the solution in an amount stoichiometrically equivalent to the calcium sulfate present in the double salt.

Although it has been shown that the solution of ammonium sulfate separated from the double salt provides a desirable medium for preparing the ammonium carbonate-ammonium sulfate solution, the invention is not limited to this practice. An ammonium carbonate-ammonium sulfate solution prepared by mixing suitable amounts of ammonium carbonate (or carbon dioxide and ammonia), ammonium sulfate and water is perfectly satisfactory, providing that the final solution contains the proper concentrations of ammonium sulfate and ammonium carbonate, as stated heretofore.

A continuous process embodying the principles of the invention may be described with reference to the appended flow diagram, Figure 1, to which reference is here made. By way of example only a few values of concentrations and temperatures are given in the discussion of the diagram. It is to be understood that the following discussion is for the purpose of illustration and example of the process only and that it is not intended that the invention be in any manner limited or restricted to the particular values of concentration and temperature stated therein, or to the particular physical apparatus indicated.

In reactor 1 gypsum, in the form of a fine powder or slurry in which the particle size preferably is less than 0.2 mm. is mixed with a 47% by weight solution of ammonium sulfate having a temperature of 70° C. The mixture leaving reactor 1 consists of the double salt and a 39% by weight solution of ammonium sulfate. This mixture is filtered on filter 2. The liquid passes in part to reactor 3 and in part to reactor 1. As the liquid flows through reactor 3, ammonia and carbon dioxide are introduced, and the heat of reaction is removed by cooling coils. The liquid, now primarily a solution of ammonium carbonate but containing a substantial amount of ammonium sulfate is passed to reactor 4, wherein it reacts with the double salt which has been passed from filter 2 to reactor 4.

It is preferred that a part of the liquid coming from filter 2 be recycled to reactor 1. This reduces the concentration of the double salt in the mixture flowing to filter 2 and substantially prevents clogging of the piping.

In reactor 4, two solid substances, ammonium sulfate and calcium carbonate, are formed. These are separated each from the other by a carefully controlled upward flow of the mixture through reactor 4. The velocity of this flow is carefully adjusted so that the ammonium sulfate settles out in countercurrent fashion, but the calcium carbonate is entrained by the flow and passes off at the top of reactor 4. A form of vessel suitable for reactor 4 consists of a cylindrical vessel in which the bottom tapers conically toward a central supply conduit.

The ammonium sulfate produced is passed to filter 6, where it is separated from the liquor and is available for further processing if such be necessary. The liquor, which is primarily a solution of ammonium sulfate in water, is recycled to reactor 4. The calcium carbonate formed in reactor 4 is passed to filter 5, where it is separated from the liquor. This liquor is also a solution of ammonium sulfate and is recycled to reactor 1 where it is reacted with calcium sulfate to form more of the double salt.

It is not necessary that all of the ammonia and carbon dioxide be introduced into reactor 3, nor that the reaction mixture be cooled to room temperature. A part of the ammonia and/or the carbon dioxide may be introduced directly into reactor 4, provided such introduction does not generate so much heat that cooling at the point of introduction would be necessary. It may even be desirable that a part of the carbon dioxide and the ammonia be introduced into reactor 4 to maintain a particularly desirable temperature level. For instance, all of the ammonia and one-third of the carbon dioxide might be introduced into reactor 3 and the remaining carbon dioxide introduced into reactor 4. A skilled practitioner in the art will immediately be able to obtain optimum control of the temperature by the controlled addition of the gaseous reactants.

There must be added to the ammonium sulfate solution before it enters reactor 4 sufficient ammonia and carbon dioxide to provide a concentration of ammonium carbonate in the reactor that is above a certain minimum value, for otherwise reaction of the double salt with the ammonium carbonate solution cannot be effected. The total amount of carbon dioxide and ammonia introduced should be sufficient to produce ammonium carbonate in an amount at least stoichiometrically equivalent to the amount of calcium sulfate present in the double salt. Amounts of ammonia and carbon dioxide lying within these two limits may also be employed, with a corresponding reduction in the yield of crystalline ammonium sulfate. Also, amounts of carbon dioxide and ammonia in excess of the stoichiometric amounts may be employed to insure complete reaction. In general, it is preferred to introduce sufficient carbon dioxide and ammonia to produce an amount of ammonium carbonate which represents between about 0.8 and about 1.2 times the amount of ammonium carbonate required theoretically to react with all of the calcium sulfate present. For practical reasons, it is further preferred that there be present in the reaction theatre from about 0.9 to about 1.05 times the amount of ammonium carbonate theoretically required for complete reaction.

To obtain optimum yields of ammonium sulfate crystals it is desirable that the concentration of ammonium sulfate in the ammonium carbonate solution be carefully controlled. The limits within which the ammonium sulfate concentration preferably are maintained are:

(1) The concentration of ammonium sulfate in the solution should not be so great that ammonium sulfate is precipitated when carbon dioxide and ammonia are added; and (2) The concentration of ammonium sulfate in the solution should be at such a level that when the solution is reacted with calcium sulfate at least one mole of ammonium sulfate crystallizes out of solution for every mole of calcium sulfate reacted.

It is preferred that the concentration of ammonium sulfate be as near the saturation level for ammonium sulfate in an ammonium carbonate solution as possible, consistent with the requirement of (1) above.

The double salts are manufactured by reacting calcium sulfate (gypsum, hemihydrate or anhydrite) in the form of a slurry of particles having a diameter less than 0.2 mm. with solutions of ammonium sulfate. The concentration of the ammonium sulfate in the solution must be higher than certain minimum values determined by equilibrium data. For example, in the preparation of syngenite ($CaSO_4 \cdot (NH_4)_2SO_4 \cdot H_2O$) the minimum concentration of ammonium sulfate is 35% by weight (point D in each figure of the cited reference). At this concentration the double salt formed is at equilibrium with gypsum ($CaSO_4 \cdot 2H_2O$). The rate at which the double salt is formed increases accordingly as the concentration of the ammonium sulfate exceeds the equilibrium concentration of 35%. A reasonable conversion rate is attained when the concentration of ammonium sulfate within the range is from about 37% to about 39% by weight. The maximum concentration of ammonium sulfate is determined by the equilibrium relations of the ammonium sulfate-ammonium carbonate-water system.

The double salt is preferably prepared by mixing calcium sulfate, water and ammonium sulfate in such proportions that the ammonium sulfate solution which remains after the formation of the double salt and after the double salt has been removed has such a concentration that by the introduction of ammonia and carbon dioxide the solution is suitable for the ammonium carbonate reaction.

It is necessary to carefully control within certain limits the concentration of ammonium sulfate in the solution in order to provide for adequate yields of crystalline ammonium sulfate upon the reaction of the solution with the double salt. This control is necessary in view of the fact that the concentration of ammonium sulfate in the solution separated from the double salt varies materially with the temperature and at certain temperatures is substantially below the saturation concentration of ammonium sulfate with respect to the ammonium sulfate-water system. Thus, employment of such a solution would reduce the yield of crystalline ammonium sulfate because of the additional ammonium sulfate required to saturate the solution with respect to the ammonium sulfate-water system so that ammonium sulfate will crystallize. It is desirable to maintain a high yield of crystals, hence, careful control of the system to maintain the concentration of ammonium sulfate in the solution separated from the double salt within the optimum range is essential. In general, the concentration of ammonium sulfate in the solution separated from the double salt should lie in the range of from about 35% to about 42%, and it is preferable that the ammonium sulfate concentration in this solution lie within the range of from about 37% to about 41%. In all cases it is preferable that the concentration of ammonium sulfate in the ammonium carbonate solution lie within 1–5% of the saturation concentration of ammonium sulfate in that solution at the temperature employed.

The temperatures at which the various phases of the process are carried out can be varied considerably without decreasing the efficacy of the process. The preparation of the double salt can take place between $-20°$ C. and $150°$ C., the range of from about $0°$ C. and $100°$ C. being preferred. At temperatures up to about $70°$ C., the double salt $CaSO_4 \cdot (NH_4)_2SO_4 \cdot H_2O$ is formed exclusively, while above about $80°$ C., the salt formed is primarily $2\,CaSO_4 \cdot (NH_4)_2SO_4$. During the introduction of ammonia and carbon dioxide into the solution of ammonium sulfate, high temperatures are undesirable and preferably temperatures not exceeding $50°$ C. are employed. For the conversion of the double salt with ammonium carbonate, the temperature should lie within the range of about $25°$ C. to about $85°$ C., the range of from about $40°$ C. to about $75°$ C. being preferred.

For the conversion of the double salt by ammonium carbonate, it is necessary that the concentration of the ammonium carbonate be above a certain minimum, which depends on the concentration of ammonium sulfate in the solution. When the ammonium sulfate concentration is 38% by weight, the minimum concentration of ammonium carbonate lies between 0.5 and 0.7% by weight. When the ammonium sulfate concentration is 47% by weight, the minimum concentration of ammonium carbonate lies between 2.5 and 3% by weight. The maximum concentration of ammonium carbonate in the ammonium carbonate-ammonium sulfate solution is fixed by the equilibrium relationships of the system. It is essential that the concentration of ammonium carbonate remain at all times below the saturation concentration for ammonium carbonate in the system, for the temperature employed, and it is preferred that the ammonium carbonate concentration lie within the range of from about 10% by weight to about 20% by weight, and still more preferably that the ammonium carbonate concentration lie within the range of from 12–15% by weight.

It is important that the diluted solution of ammonium sulfate created during the formation of the double salt be separated as completely as possible from the double salt. Therefore, when the double salt is filtered off, the solution adhering thereto is displaced by a saturated solution of ammonium sulfate, preferably the solution obtained after the separation of crystallized ammonium sulfate and calcium carbonate from the reaction mixture following the reaction of the double salt and ammonium carbonate. During this washing, a liquid is removed from the filter, said liquid consisting of a mixture of the saturated ammonium sulfate solution and the less concentrated solution which has been displaced from the double salt.

This liquid may be advantageously employed in the preparation of a further amount of the double salt.

The following example is illustrative of the process of the invention. It is to be understood that the example is for the purpose of illustration only and that the invention is not to be regarded as limited to any of the specific conditions cited therein. There is appended hereto Figure 2, to which reference should be made in following the procedure stated in the example.

To prepare the double salt a mixture is made up of:

186.9 kgs. of gypsum (175.3 kgs. of $CaSO_4$, 11.6 kgs. $H_2O$);

Stream A—457.7 kgs. ammonium sulfate, 23.6 kgs. ammonium carbonate and 576.6 kgs. water;

Stream B—336.1 kgs. ammonium sulfate, 6.2 kgs. ammonium carbonate and 549.3 kgs. water.

These streams are fed into reactor I at a temperature of 70° C. The temperature of the reaction mixture is maintained at about 65 to 70° C. The mixture is stirred for 20 minutes. 286 kgs. of the double salt, $$CaSO_4 \cdot (NH_4)_2SO_4 \cdot H_2O$$

is formed. Due to the presence of some ammonium carbonate, 17.8 kgs. of $CaCO_3$ is formed. 16.1 kgs. of gypsum (15.1 kgs. $CaSO_4$, 1.0 kg. $H_2O$) remains unconverted.

The total quantity of solid substance is filtered off. The filtrate, amounting to 1496.6 kgs., is divided as follows:

891.6 kgs. are returned as stream B to reactor I;
536.1 kgs. are passed (as stream Z) to absorption tower II;
54.3 kgs. are passed as stream Y to thickener V;
14.6 kgs. are passed as stream X to reactor III.

In addition to the 536.1 kgs. of stream Z, 200 kgs. of a concentrated ammonium sulfate solution (stream C) is introduced into absorption tower II. Solution C is composed of: 91.3 kgs. ammonium sulfate, 6.0 kgs. ammonium carbonate and 102.7 kgs. water. 44.2 kgs. ammonia and 17.2 kgs. carbon dioxide are also introduced into reactor II. Cooling insures that the temperature of the absorption tower is maintained between about 40 and 45° C.

The filter cake (double salt) obtained from reactor I is passed to vessel IV, where it is washed with 1057.9 kgs. of concentrated ammonium sulfate solution (stream C') which contains: 482.8 kgs. ammonium sulfate, 31.1 kgs. ammonium carbonate and 544.0 kgs. water.

The liquid which flows off during this washing is solution A, which is recycled to reactor I.

The filter cake is now passed to reactor III. The cake contains 319.9 kgs. of liquid which is composed of: 146.0 kgs. ammonium sulfate, 9.7 kgs. ammonium carbonate and 164.2 kgs. water.

Stream E, which is obtained from absorption tower II, is passed into reactor III. Stream E has the composition: 293.5 kgs. ammonium sulfate, 47.2 kgs. ammonium carbonate, 31.0 kgs. ammonia and 465.7 kgs. water.

Stream X also passes into reactor III. There are 14.6 kgs. of this solution, which is composed of: 5.5 kgs. ammonium sulfate, 0.1 kg. ammonium carbonate and 9.0 kgs. water.

Also, 40.0 kgs. of carbon dioxide is introduced into reactor III. The heat of reaction raises the temperature of the reaction mixture to 70° C., where it is maintained for the duration of the reaction.

When 93% of the double salt has been converted, the reaction mixture in reactor III consists of: 705.2 kgs. ammonium sulfate, 44.5 kgs. ammonium carbonate, 19.9 kgs. double salt, 121.9 kgs. calcium carbonate and 640.3 kgs. water.

144.2 kgs. of ammonium sulfate crystallizes out (stream W). Stream F, consisting of 561.0 kgs. ammonium sulfate, 44.5 kgs. ammonium carbonate and 640.3 kgs. water, flows with the calcium carbonate and the remaining double salt to thickener V; 54.3 kgs. of stream Y also pass to this thickener. Stream Y has the composition: 20.5 kgs. ammonium sulfate, 0.4 kg. ammonium carbonate and 33.4 kgs. water.

The remaining double salt is also converted in this thickener. After this conversion, the over-all composition of the mixture in thickener V is: 128.9 kgs. calcium carbonate, 599.9 kgs. ammonium sulfate, 38.2 kgs. ammonium carbonate and 674.9 kgs. water.

At the bottom of thickener V a concentration suspension (stream G) is drawn off and passed to filter VI. The filter cake (stream H) consists of: 128.9 kgs. calcium carbonate, 25.2 kgs. ammonium sulfate, 1.6 kgs. ammonium carbonate and 28.3 kgs. water.

The filtrate and the liquid which overflows at thickener VI are combined and constitute streams C and C'. The composition of these combined streams is: 574.7 kgs. ammonium sulfate, 36.6 kgs. ammonium carbonate and 646.6 kgs. water.

The ammonium sulfate crystals which settle out in reactor III are separated from the reaction mixture in a filter and the filtrate recycled to reactor III.

I claim as my invention:

1. A process for preparing crystalline ammonium sulfate which comprises mixing finely divided calcium sulfate, ammonium sulfate and water in such proportions that there is formed at least one double salt of calcium sulfate and ammonium sulfate selected from the group consisting of the salts $(NH_4)_2SO_4 \cdot CaSO_4 \cdot H_2O$ and $(NH_4)_2SO_4 \cdot 2CaSO_4$, separating said double salt from the mother liquor, preparing a solution of ammonium carbonate by adding to water amounts of carbon dioxide and ammonia sufficient to form an amount of ammonium carbonate stoichiometrically equivalent on a molar basis to the amount of calcium sulfate present in the said double salt, the concentration of ammonium carbonate in said solution being at least 0.5% by weight of said solution, adding ammonium sulfate to said ammonium carbonate solution until the concentration of ammonium sulfate in the solution approaches closely but is less than the saturation concentration of ammonium sulfate in said solution, mixing said ammonium sulfate-ammonium carbonate solution with the double salt and separating as product the crystalline ammonium sulfate formed.

2. A process comprising preparing a double salt of calcium sulfate and ammonium sulfate by mixing finely divided calcium sulfate, ammonium sulfate and water in such proportions that there is formed at least one double salt of ammonium sulfate and calcium sulfate selected from the group consisting of $(NH_4)_2SO_4 \cdot CaSO_4 \cdot H_2O$ and $(NH_4)_2SO \cdot 2CaSO_4$ and the solution in equilibrium with the double salt formed contains ammonium sulfate in a concentration closely approaching but less than the minimum saturation concentration of ammonium sulfate in a solution of ammonium carbonate in water in which the ammonium carbonate concentration is at least 0.5% by weight of said solution, separating said double salt from the solution, introducing carbon dioxide and ammonia into the said solution of ammonium sulfate in such amounts that ammonium carbonate is formed in an amount stoichiometrically equivalent on a molar basis to the calcium sulfate present in the said double salt, the concentration of ammonium carbonate in said solution of ammonium sulfate being at least 0.5% by weight of said solution, mixing said ammonium carbonate-ammonium sulfate solution with the double salt and separating as product the ammonium sulfate crystals formed.

3. A process comprising preparing a double salt of calcium sulfate and ammonium sulfate by mixing finely divided calcium sulfate, ammonium sulfate and water in such proportions that there is formed at least one double salt of ammonium sulfate and calcium sulfate selected from the group consisting of $(NH_4)_2SO_4 \cdot CaSO_4 \cdot H_2O$ and $(NH_4)_2SO_4 \cdot 2CaSO_4$ and the solution in equilibrium with the double salt formed contains from about 37% to about 41% by weight ammonium sulfate, separating said double salt from the solution, introducing carbon dioxide and ammonia into the solution of ammonium sulfate in such amounts that ammonium carbonate is formed in an amount stoichiometrically equivalent on a molar basis to the calcium sulfate present in the said double salt, the concentration of ammonium carbonate in said solution of ammonium sulfate being at least 0.5% by weight of said solution, mixing said ammonium carbonate-ammonium sulfate solution with the double salt and separating as product the ammonium sulfate crystals formed.

4. A continuous process for producing crystalline ammonium sulfate comprising continuously forming a double salt of calcium sulfate and ammonium sulfate by mixing finely divided solid calcium sulfate with a solution of ammonium sulfate in water in such proportions that there is formed at least one double salt of ammonium sulfate and calcium sulfate selected from the group consisting of $(NH_4)_2SO_4 \cdot CaSO_4 \cdot H_2O$ and $(NH_4)_2SO_4 \cdot 2CaSO_4$ and the solution in equilibrium with the double salt that forms contains ammonium sulfate in a concentration closely approaching but less than the minimum saturation concentration of ammonium sulfate in a solution of ammonium carbonate in water in which the ammonium carbonate concentration is at least 0.5% by weight of said solution, continuously separating the said double salt from the solution, continuously introducing carbon dioxide and ammonia into the separated solution in such amounts that ammonium carbonate is formed in an amount stoichiometrically equivalent on a molar basis to the amount of calcium sulfate introduced to form the said double salt, the concentration of ammonium carbonate in said solution of ammonium sulfate being at least 0.5% by weight of said solution, continuously mixing said ammonium carbonate-ammonium sulfate solution with the double salt, continuously separating as product the crystalline ammonium sulfate thus formed, continuously removing solid calcium carbonate, and continuously returning the ammonium sulfate-containing solution thus obtained back to the first reaction theatre to form more of the double salt with calcium sulfate.

5. A process comprising mixing an aqueous solution of ammonium sulfate and finely divided solid calcium sulfate in a first reaction zone to form at least one double salt of ammonium sulfate and calcium sulfate selected from the group consisting of the salts $(NH_4)_2SO_4 \cdot CaSO_4 \cdot H_2O$ and $(NH_4)_2SO_4 \cdot 2CaSO_4$, withdrawing as effluent from said first reaction zone a suspension of said double salt of calcium sulfate and ammonium sulfate in an ammonium sulfate solution, separating said solid double salt from said ammonium sulfate solution, adding $CO_2$ and $NH_3$ to said ammonium sulfate solution in a second reaction zone in such amounts that ammonium carbonate is formed in such amount that the concentration of ammonium carbonate in said solution is at least 0.5% by weight of said solution, withdrawing as effluent from said second reaction zone the resulting solution of ammonium sulfate and ammonium carbonate, admixing in a third reaction zone the solid double salt with the effluent from said second reaction zone, withdrawing from said third reaction zone crystalline ammonium sulfate as product, and a slurry of calcium carbonate in a concentrated ammonium sulfate solution, removing said calcium carbonate and recycling said concentrated ammonium sulfate solution to the first reaction zone.

6. A process comprising mixing an aqueous solution of ammonium sulfate and finely divided solid calcium sulfate in a first reaction zone, in proportions such that there is formed at least one double salt of ammonium sulfate and calcium sulfate selected from the group consisting of $(NH_4)_2SO_4 \cdot CaSO_4 \cdot H_2O$ and $(NH_4)_2SO_4 \cdot 2CaSO_4$ and the effluent from said first reaction zone contains a concentration of ammonium sulfate which closely approaches but is less than the saturation concentration of ammonium sulfate in a solution of ammonium carbonate in which the ammonium carbonate concentration is at least 0.5% by weight of said solution, withdrawing as effluent from said first reaction zone a suspension of said double salt of calcium sulfate and ammonium sulfate in an ammonium sulfate solution, separating said solid double salt from said ammonium sulfate solution, adding $CO_2$ and $NH_3$ to said ammonium sulfate solution in a second reaction zone, in amounts sufficient to form ammonium carbonate in an amount stoichiometrically equivalent on a molar basis to the amount of calcium sulfate present in the said double salt, the concentration of ammonium carbonate in said solution of ammonium sulfate being at least 0.5% by weight of said solution, withdrawing as effluent from said second reaction zone the resulting solution of ammonium carbonate and ammonium sulfate, admixing in a third reaction zone the said solid double salt with the effluent from said second reaction zone, withdrawing from said third reaction zone crystalline ammonium sulfate as product, and a slurry of calcium carbonate in a concentrated ammonium sulfate solution, removing said calcium carbonate and recycling said concentrated ammonium sulfate solution to the first reaction zone.

7. A process as defined in claim 5 in which a part of the ammonium sulfate solution separated from the said double salt is returned to the said first reaction zone.

References Cited in the file of this patent
UNITED STATES PATENTS

| | | |
|---|---|---|
| 1,902,649 | Larsson | Mar. 21, 1933 |
| 2,656,247 | Robinson | Oct. 20, 1953 |

OTHER REFERENCES

Mellor: "Comprehensive Treatise on Inorganic and Theoretical Chemistry," Longmans, Green and Co., N. Y., 1923, vol. 3, pages 812, 813.

Hill: "Ternary Systems. XX. Calcium sulfate, ammonium sulfate and water," J. American Chem. Soc., pages 645–651. April 15, 1935, vol. 57.